(12) United States Patent
Lee

(10) Patent No.: US 9,864,259 B2
(45) Date of Patent: Jan. 9, 2018

(54) BEAM PROJECTOR HAVING A MECHANISM FOR COMPENSATING MOVEMENT THEREOF

(71) Applicant: Joonsub Lee, Seoul (KR)

(72) Inventor: Joonsub Lee, Seoul (KR)

( * ) Notice: Subject to any disclaimer, the term of this patent is extended or adjusted under 35 U.S.C. 154(b) by 35 days.

(21) Appl. No.: 15/169,855

(22) Filed: Jun. 1, 2016

(65) Prior Publication Data

US 2017/0034489 A1 Feb. 2, 2017

(30) Foreign Application Priority Data

Jul. 27, 2015 (KR) .................. 10-2015-0105621

(51) Int. Cl.
   G03B 21/14    (2006.01)
   H04N 9/31     (2006.01)
   G03B 21/00    (2006.01)
   G02B 27/64    (2006.01)

(52) U.S. Cl.
   CPC ......... *G03B 21/142* (2013.01); *G02B 27/646* (2013.01); *G03B 21/006* (2013.01); *H04N 9/3185* (2013.01); *H04N 9/3194* (2013.01); *G03B 2205/0007* (2013.01); *G03B 2205/0038* (2013.01)

(58) Field of Classification Search
   CPC .. G02B 27/646; G03B 21/006; G03B 21/142; G03B 2205/0007; G03B 2205/0038; H04N 9/3185; H04N 9/3194
   See application file for complete search history.

(56) References Cited

U.S. PATENT DOCUMENTS

2012/0113514 A1* 5/2012 Rodman .............. G02B 27/646
                                                      359/556

FOREIGN PATENT DOCUMENTS

JP         2005189733 A  *  7/2005  ............. G03B 21/00

* cited by examiner

*Primary Examiner* — Sultan Chowdhury
*Assistant Examiner* — Magda Cruz
(74) *Attorney, Agent, or Firm* — Patent Office of Dr. Chung Park

(57) ABSTRACT

Provided is a beam projector including: an image generation unit configured to generate an image light for an image signal; an optical unit configured to enlarge the image light to project toward a screen; a housing provided with the image generation unit; a motion sensor configured to detect movement of the housing; and a compensation driving unit configured to move at least one of the image generation unit and the optical unit so as to countervail the movement.

5 Claims, 5 Drawing Sheets

[Fig. 1]
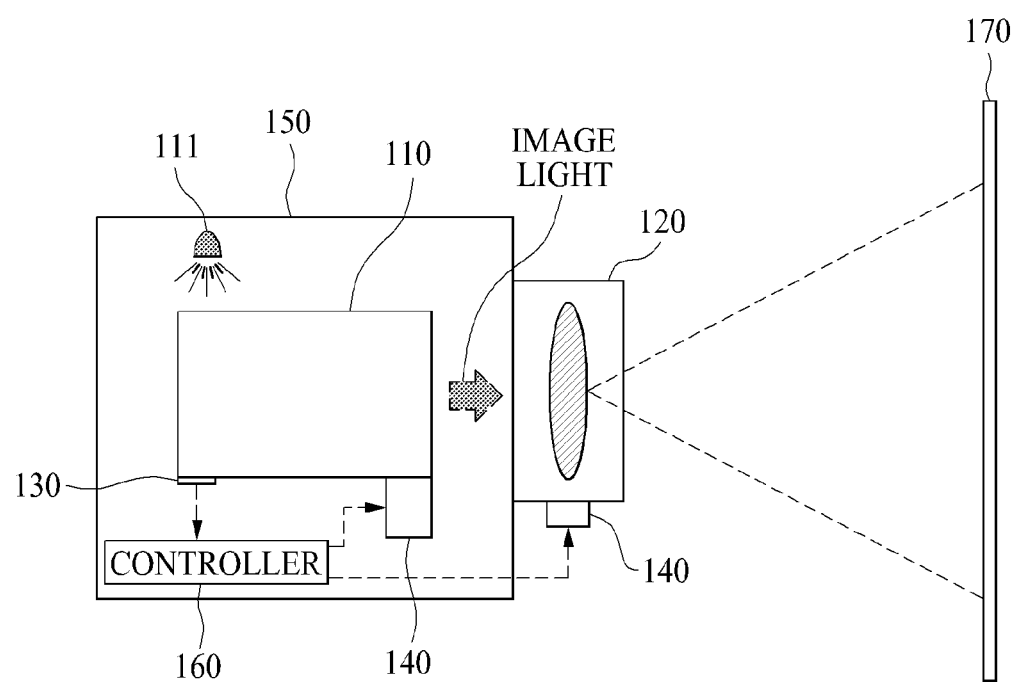

[Fig. 2]
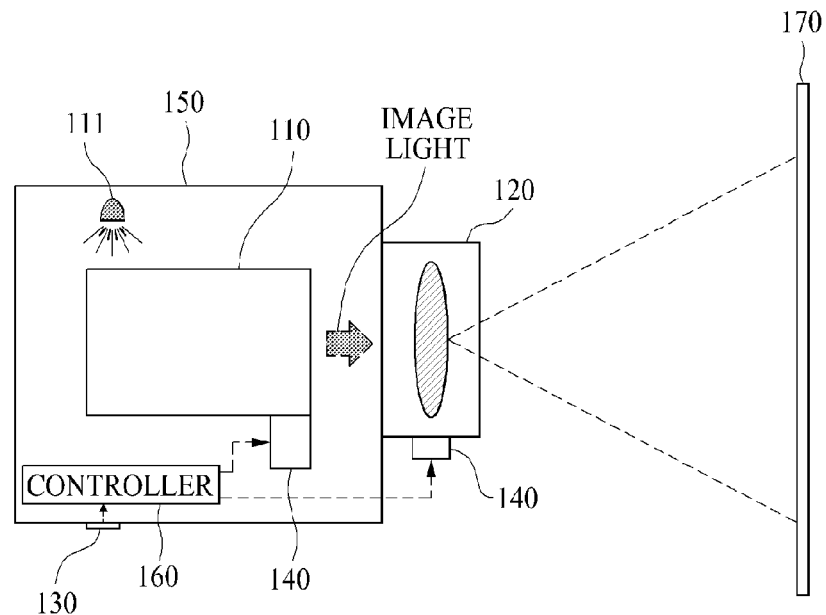
[Fig. 3]
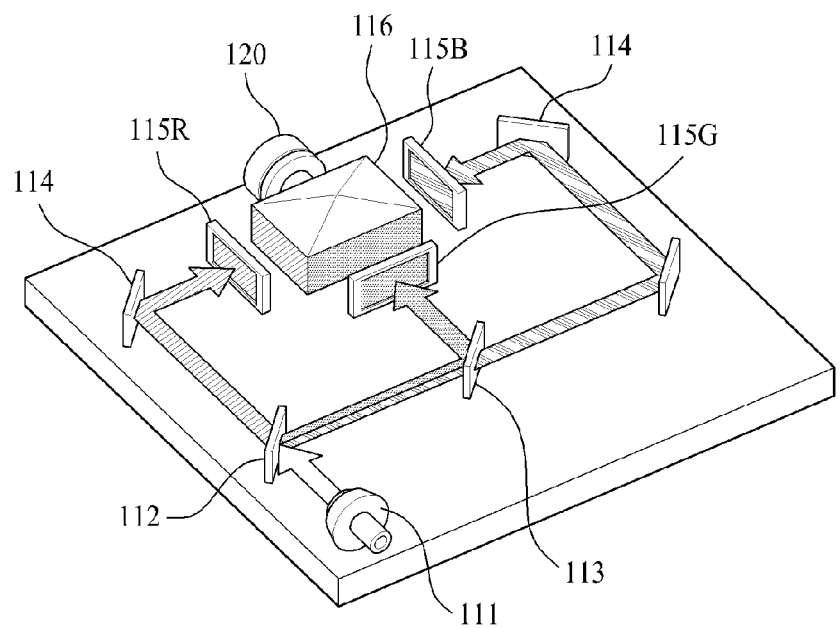

[Fig. 4]
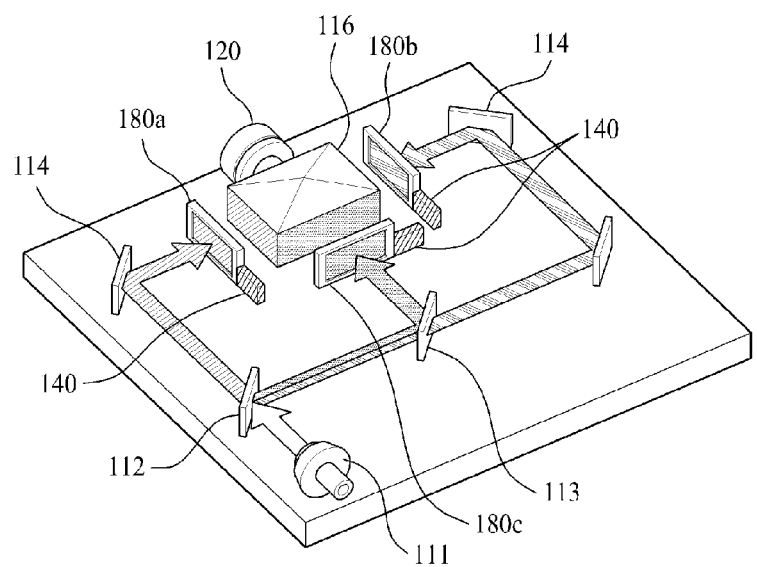
[Fig. 5]
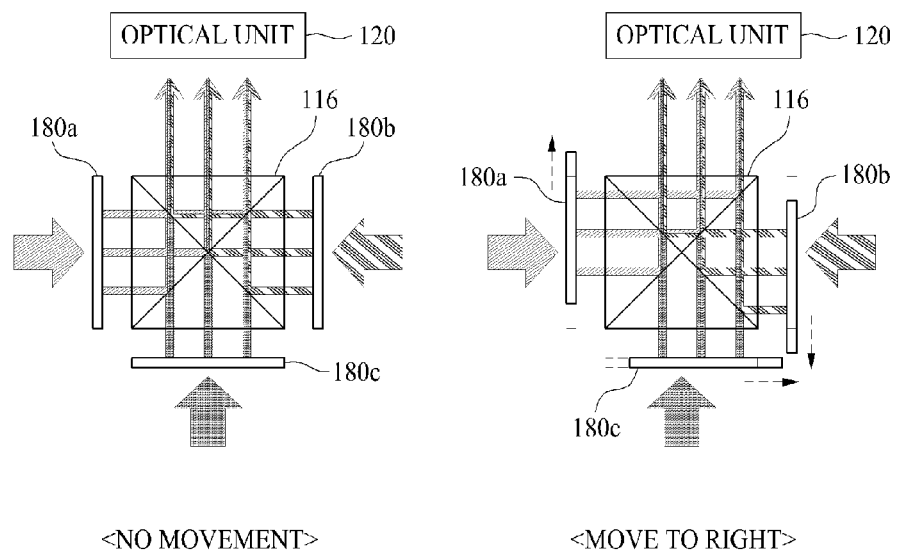
<NO MOVEMENT>  <MOVE TO RIGHT>

[Fig. 6]
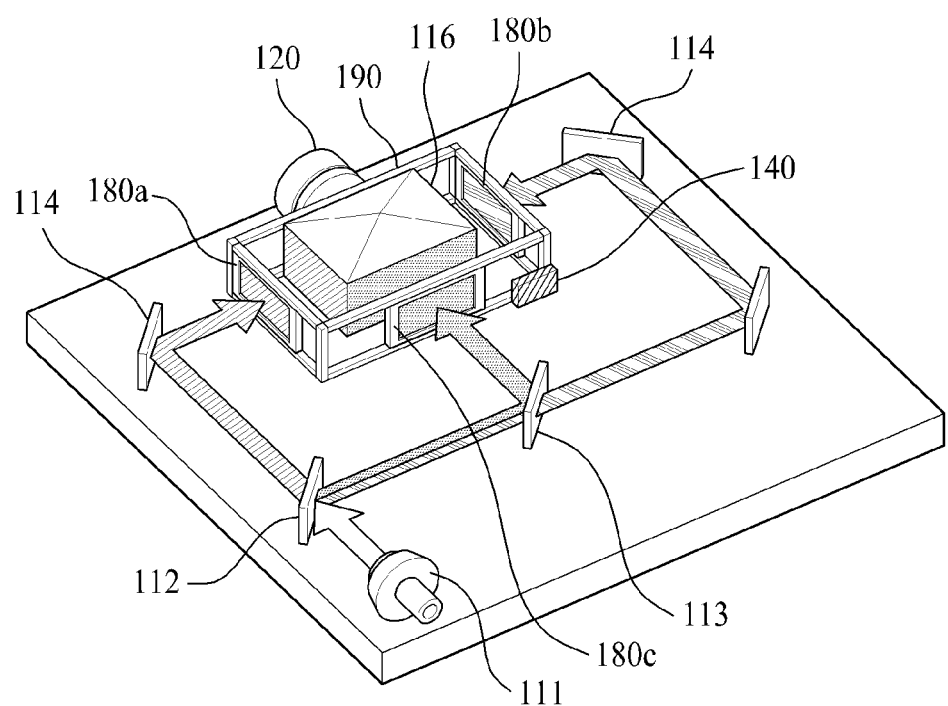

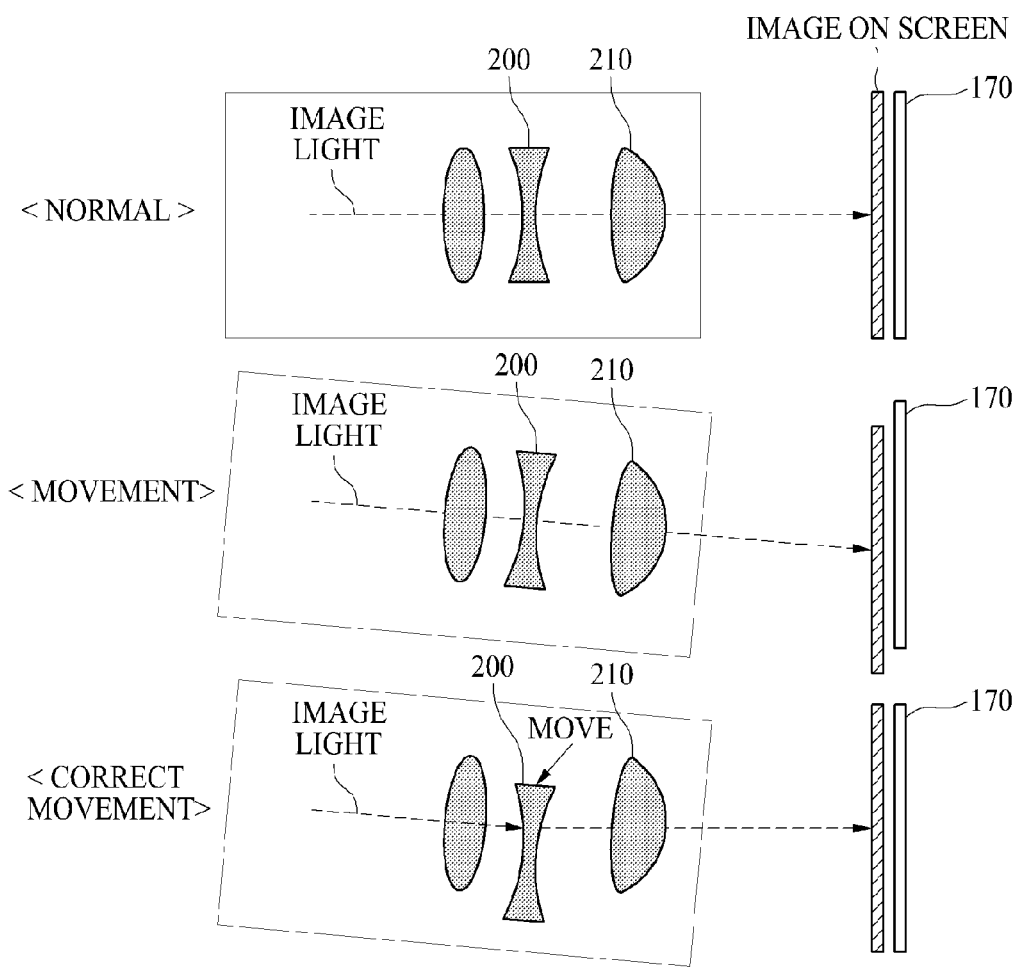

BEAM PROJECTOR HAVING A MECHANISM FOR COMPENSATING MOVEMENT THEREOF

CROSS-REFERENCE TO RELATED APPLICATIONS

This application claims priority under 35 U.S.C. §119 from Korean Application No. 10-2015-0105621 filed on Jul. 27, 2015, the subject matter of which is incorporated herein by reference.

BACKGROUND OF THE INVENTION

Field of the Invention

The present disclosure relates to a beam projector.

Description of the Related Art

A beam projector can generate an image light for an image signal and enlarge the generated image light through a lens to project on a screen.

Accordingly, the beam projector can provide a large-sized screen which a big-screen TV such as a liquid crystal display (LCD) TV or an organic light-emitting diode (OLED) TV cannot provide to a viewer.

Thus, since the beam projector provides a large-sized screen, it may be susceptible to shaking of equipment itself or vibration, and, accordingly, research on the beam projector which is less affected by shaking or vibration is progressed.

SUMMARY OF THE INVENTION

The present disclosure has been made in view of the above problems, and provides a beam projector that compensates for a shake of an image projected on a screen due to movement of equipment itself or vibration.

In accordance with an aspect of the present disclosure, a beam projector includes: an image generation unit configured to generate an image light for an image signal; an optical unit configured to enlarge the image light to project toward a screen; a housing provided with the image generation unit; a motion sensor configured to detect movement of the housing; and a compensation driving unit configured to move at least one of the image generation unit and the optical unit so as to countervail the movement.

The image generation unit includes a plurality of LCDS, and a light synthesis unit configured to synthesize part light image from each of the plurality of LCDS to generate the light image, and the compensation driving unit moves the plurality of LCDS so as to countervail the movement.

The plurality of LCDS includes a first LCD, a second LCD, and a third LCD, and the first LCD and the second LCD are disposed respectively to be adjacent to a first side and a second side of the light synthesis unit which face each other, and the compensation driving unit moves the first LCD and the second LCD in an opposite direction.

The image generation unit includes a frame to which components of the image generation unit are fixed, and the compensation driving unit moves the frame so as to countervail the movement.

The optical unit includes a plurality of lenses, and the compensation driving unit tilts at least one of the plurality of lenses or moves vertical and horizontal directions.

The motion sensor is attached to at least one of the image generation unit, the optical unit, and the housing.

BRIEF DESCRIPTION OF THE DRAWINGS

The objects, features and advantages of the present disclosure will be more apparent from the following detailed description in conjunction with the accompanying drawings, in which:

FIG. 1 and FIG. 2 are a diagram illustrating a beam projector according to an embodiment of the present disclosure; and FIG. 3 is a diagram illustrating an image generation unit of an LCD type;

FIG. 4 to FIG. 7 are diagrams illustrating an example of an operation of a compensation driving unit of a beam projector according to an embodiment of the present disclosure.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The terms and words used in the following description and claims are not limited to the bibliographical meanings, but, are merely used by the inventor to enable a clear and consistent understanding of the present disclosure.

In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

FIG. 1 is a diagram illustrating a beam projector according to an embodiment of the present disclosure. As shown in FIG. 1, the beam projector according to an embodiment of the present disclosure may include an image generation unit 110, an optical unit 120, a motion sensor 130, and a compensation driving unit 140. At this time, the image generation unit 110 may be provided in a housing 150, and the housing 150 may form the outer surface of the beam projector according to an embodiment of the present disclosure.

The image generation unit 110 may generate an image light for an image signal. A controller 160 may output the image signal by processing image information. The controller 160 may includes a memory (not shown) which stores the image information and is required in a processing of the image information.

At this time, a structure of the image generation unit 110 may be changed according to a generating method of the image light.

For example, a single-chip based digital light processing (DLP) beam projector is small and light by using only a single chip. The DLP method may integrate thousands of microscopic mirrors corresponding to a pixel on a chip named as a digital mirror device (DMD) and may tilt the mirrors to generate an image light from the image signal with an extent of reflecting the light.

A triple-chip based DLP beam projector may show a superior quality in comparison with the single-chip based DLP beam projector, and brightness level may exceed 10,000 lumens.

A cathode ray tube (CRT) typed beam projector may generate an image light by using three electron guns, and may provide an excellent image quality.

A liquid crystal on silicon (LCoS) typed beam projector may generate an image light by using a silicon wafer having an integrated LCD.

Meanwhile, as shown in FIG. 3, the image generation unit 110 may generate a light image by using LCD. That is, a light emitted from a light source 111 may be separated into red light, green light, and blue light through a red dichroic mirror 112 and a blue dichroic mirror 113, and the red light, the green light, and the blue light may reach a red LCD 115R, a green LCD 115G, and a blue LCD 115B by a mirror 114.

The red LCD 115R, the green LCD 115G, and the blue LCD 115B may generate a red part image light, a green part image light, and a blue part image light according to each image signal, and a light synthesis unit 116 may generate an image light by synthesizing the red part image light, the green part image light, and the blue part image light. At this time, the light synthesis unit 116 may include a dichroic combiner cube.

Meanwhile, the optical unit 120 of FIG. 1 and FIG. 2 may enlarge the image light to project toward a screen 170. To this end, the optical unit 120 may include a plurality of lenses, and may further include a body tube equipped with a plurality of the lens.

The motion sensor 130 may sense the movement of at least one of the image generation unit 110 and the optical unit 120. The motion sensor 130 may be at least one of a vibration sensor, an acceleration sensor or a gyro sensor, but is not limited thereto.

Such a motion sensor 130 may sense a speed and a direction of the shaking of the beam projector itself. The case of the shaking of the beam projector may include the case of the vibration of the projector beam.

The motion sensor 130 may output a sensing signal to the controller 160 according to the movement of at least one of the image generation unit 110 and the optical unit 120. The controller 160 may output a control signal for countervailing the movement to the compensation driving unit 140.

The compensation driving unit 140 may move at least one of the movement unit 110 and the optical unit 120 to countervail the movement. The compensation driving unit 140 may be operated according to the control signal and may include an actuator. At this time, the actuator may move at least one of the image generation unit 110 and the optical unit 120 in an axial direction through an electromagnetic force according to supply of current. At this time, the axial direction may be at least one of x-axis, y-axis, z-axis, yaw-axis, roll-axis, and pitch-axis.

Meanwhile, as shown in FIG. 2, the beam projector according to an embodiment of the present disclosure may include the image generation unit 110, the optical unit 120, the housing 150, the motion sensor 130, and the compensation driving unit 140.

Since the image generation unit 110 and the optical unit 120 are previously described in detail with reference to FIG. 1 and FIG. 3, an explanation thereof is omitted.

The housing 150 may be provided with the image generation unit 110. As described above, the housing 150 may form the outer surface of the beam projector according to an embodiment of the present disclosure.

The motion sensor 130 may detect the movement of the housing 150. In the case of the beam projector of FIG. 1, the motion sensor 130 may detect the movement of at least one of the image generation unit 110 and the optical unit 120.

Alternatively, in the case of the beam projector of FIG. 2, the motion sensor 130 may sense the movement of the housing 150.

The elements that configure the beam projector, such as the image generation unit 110, the optical unit 120, the light source 111, and a power supply (not shown) such as SMPS may be connected to the housing 150 by various fastening means and fastening methods. Therefore, when the beam projector according to an embodiment of the present disclosure is moved by a specific cause, the above elements may move together with the housing 150.

Therefore, as described above, that the motion sensor 130 senses the movement of the housing 150 may be interpreted to mean that the movement of various elements connected to the housing 150 as well as the movement of the housing 150 is sensed.

Accordingly, the motion sensor 130 may be attached to various elements of the beam projector according to an embodiment of the present disclosure. For example, as shown in FIG. 1, the motion sensor 130 may be attached to the image generation unit 110 so as to sense the movement of the housing 150, or may be attached, as shown in FIG. 2, to the housing 150. In addition, although not shown in drawing, it may be attached to the optical unit 120.

The compensation driving unit 140 may move at least one of the image generation unit 110 and the optical unit 120 so as to countervail the movement of the housing 150.

The image implemented in the screen 170 may be shaken by the shaking of the beam project such as vibration, and this shaking may cause discomfort to a person who watches the image through the screen 170.

The beam projector according to an embodiment of the present disclosure may include the motion sensor 130 that can sense the speed and the direction of the vibration or the shaking, and may move at least one of the housing 150, the image generation unit 110, and the optical unit 120 according to the sensed movement to correct the shaking of the image implemented on the screen 170.

In the meantime, as shown in FIG. 4, the image generation unit 110 may include a plurality of LCDs 180a, 180b, 180c and a light synthesis unit 116 which synthesizes part light image from each of the plurality of LCDs 180a, 180b, 180c to generate a light image.

The compensation driving unit 140 may move the plurality of LCDs so as to countervail the movement of at least one of the image generation unit 110 and the optical unit 120 or the movement of the housing 150.

At this time, the plurality of LCDs may include a first LCD 180a, a second LCD 180b, and a third LCD 180c, and the first LCD 180a and the second LCD 180b may be respectively disposed to be adjacent to a first side and a second side of the light synthesis unit 116 which face each other, and the compensation driving unit 140 may move the first LCD 180a and the second LCD 180b in the opposite direction.

For example, as shown in FIG. 5, when the housing 150 moves to the right, the compensation driving unit 140 attached to the third LCD 180c may move the third LCD 180c to the right. In addition, the compensation driving unit 140 attached to the first LCD 180a may move the first LCD 180a toward the light synthesis unit 116, and the compensation driving unit 140 attached to the second LCD 180b may move the second LCD 180b away from the light synthesis unit 116.

Thus, the traveling path of part light image passed through the first LCD 180a, the second LCD 180b, and the third LCD 180*c* may coincide while passing through the light synthesis unit 116, so that an image light is generated.

At this time, since the image before passing through the optical unit 120 and the image shown in the screen 170 after passing through the optical unit 120 are displayed in the opposite direction, the image shown in the screen 170 may move to the left.

Thus, when the housing 150 moves to the right, the image may be moved to the left so as to compensate the movement of the housing 150.

The third LCD 180*c* may be disposed to be adjacent to a third side connected to the first side and the second side of the light synthesis unit 116, and the compensation driving unit 140 may move the third LCD 180*c* to be parallel to the third side.

At this time, the first LCD 180*a* and the second LCD 180*b* may be an LCD for red and an LCD for blue respectively, and the third LCD 180*c* may be an LCD for green.

Meanwhile, the image generation unit 110 may include a frame 190 to which components of the image generation unit 110 are fixed, and the compensation driving unit 140 may move the frame 190 so as to countervail the movement.

For example, as shown in FIG. 6, the first LCD 180*a* to the third LCD 180*c*, and the light synthesis unit 116 may be fixed to the frame 190, and the compensation driving unit 140 may move the frame 190.

The components of the image generation unit 110 fixed to the frame 190 are not limited to the first LCD 180*a* to the third LCD 180*c*, and the light synthesis unit 116. For example, a plurality of dichroic mirrors and a plurality of mirrors may be fixed to the frame 190 together with the first LCD 180*a* to the third LCD 180*c*, and the light synthesis unit 116, and this frame 190 may be moved by the compensation driving unit 140.

For example, when the housing 150 moves to the right, the frame 190 may be moved to the right by the compensation driving unit 140. Accordingly, the image light before passing through the optical unit 120 may also be moved to the right.

As explained above, since the image before passing through the optical unit 120 and the image shown in the screen 170 after passing through the optical unit 120 are displayed in the opposite direction, the image shown in the screen 170 may move to the left.

In addition, even in the case of other type projector instead of the LCD type projector, the components of the image generation unit 110 may be fixed to the frame 190, and the frame 190 may be moved by the compensation driving unit 140.

For example, in the case of triple-chip based DLP beam projector, three DMD chips and mirrors may be fixed to the frame 190, and this frame 190 may be moved by the compensation driving unit 140.

Meanwhile, as shown in FIG. 7, the optical unit 120 may include a plurality of lenses. The compensation driving unit 140 may tilt at least one of a plurality of lenses or move in a vertical and horizontal directions.

For example, as shown in FIG. 7, a plurality of lens may include a correction lens 200 and a focus lens 210. Due to the movement of the image generation unit 110 or the movement of the housing 150, the traveling direction of the image light may be changed, and the location of the image projected on the screen 170 may be corrected as the correction lens 200 is moved by the compensation driving unit 140.

That is, when the beam projector according to an embodiment of the present disclosure is tilted down, the traveling direction of the image light may also be tilted down. Accordingly, the image shown in the screen 170 may also move down.

In order to correct this, the correction lens 200 may also be moved down, and thus, the image shown in the screen 170 may move upward so that the movement of the image according to the tilt of the beam projector may be countervailed.

In the above, it is described that the location of the image projected on the screen 170 is corrected by the movement of the lens, but the location of the image projected on the screen 170 may be corrected by the movement of a body tube equipped with a plurality of the lens.

The beam projector according to an embodiment of the present disclosure may include the compensation driving unit which senses the movement of at least one of the image generation unit, the optical unit, and the housing to compensate the movement so that it is possible to compensate a shake of an image projected on a screen due to movement of equipment itself or vibration.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A beam projector comprising:
   an image generation unit configured to generate an image light for an image signal;
   an optical unit configured to enlarge the image light to project toward a screen;
   a housing provided with the image generation unit;
   a motion sensor configured to detect movement of the housing; and
   a compensation driving unit configured to move at least one of the image generation unit and the optical unit so as to countervail the movement,
   wherein the image generation unit comprises a plurality of LCDS, and a light synthesis unit configured to synthesize part light image from each of the plurality of LCDS to generate the light image, and the compensation driving unit moves the plurality of LCDS so as to countervail the movement.

2. The beam projector of claim 1, wherein the plurality of LCDS comprises a first LCD, a second LCD, and a third LCD,
   and the first LCD and the second LCD are disposed respectively to be adjacent to a first side and a second side of the light synthesis unit which face each other,
   and the compensation driving unit moves the first LCD and the second LCD in an opposite direction.

3. The beam projector of claim 1, wherein the image generation unit comprises a frame to which components of the image generation unit are fixed,
   and the compensation driving unit moves the frame so as to countervail the movement.

4. The beam projector of claim 1, wherein the optical unit comprises a plurality of lenses,
   and the compensation driving unit tilts at least one of the plurality of lenses or moves vertical and horizontal directions.

5. The beam projector of claim 1, wherein the motion sensor is attached to at least one of the image generation unit, the optical unit, and the housing.

* * * * *